US006318228B1

(12) United States Patent
Thompson

(10) Patent No.: US 6,318,228 B1
(45) **Date of Patent: *Nov. 20, 2001**

(54) FORCIBLE ENTRY DEVICE

(75) Inventor: James M. Thompson, Stuart, FL (US)

(73) Assignee: Ramtech 2000, L.L.C., Charlotte, NC (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/065,746

(22) Filed: Apr. 24, 1998

Related U.S. Application Data

(60) Provisional application No. 60/044,260, filed on Apr. 24, 1997, and provisional application No. 60/066,900, filed on Nov. 20, 1997.

(51) Int. Cl.[7] .......... B64D 1/04

(52) U.S. Cl. .......... 89/1.14; 173/90

(58) Field of Search .......... 89/1.14; 173/211, 173/133, 132, 90; 227/9, 10

(56) References Cited

U.S. PATENT DOCUMENTS

| | | | | |
|---|---|---|---|---|
| Re. 30,617 | * | 5/1981 | Butler et al. | 227/8 |
| 1,380,559 | | 6/1921 | Jespersen . | |
| 1,606,253 | | 11/1926 | McColgan . | |
| 1,668,432 | * | 5/1928 | Thorstenson | 42/1.12 |
| 4,074,777 | | 2/1978 | Andersson et al. | 173/138 |
| 4,295,506 | | 10/1981 | Nicholson | 144/193 |
| 4,429,727 | | 2/1984 | Wilson | 144/193 |
| 4,589,457 | | 5/1986 | Schmidt et al. | 144/193 |
| 4,601,350 | | 7/1986 | Mikiya | 173/117 |
| 4,624,323 | * | 11/1986 | Burrola | 173/90 |
| 4,631,779 | * | 12/1986 | Catiello | 42/1.12 |
| 4,686,786 | * | 8/1987 | Termet | 42/1.12 |
| 4,903,784 | | 2/1990 | Glaser | 173/116 |
| 4,938,297 | * | 7/1990 | Schmidt | 175/19 |
| 5,088,566 | | 2/1992 | Gustafsson et al. | 173/116 |
| 5,136,921 | * | 8/1992 | Buchel | 89/1.14 |
| 5,167,043 | * | 12/1992 | Lopez et al. | 7/144 |
| 5,196,647 | * | 3/1993 | Majors | 102/303 |
| 5,237,613 | * | 8/1993 | Berry et al. | 60/632 |
| 5,303,631 | * | 4/1994 | Frehaut et al. | 89/1.14 |
| 5,329,839 | * | 7/1994 | Ehmig | 89/1.14 |
| 5,415,241 | * | 5/1995 | Ruffu et al. | 173/212 |
| 5,797,463 | * | 8/1998 | Winter et al. | 173/211 |
| 5,822,905 | * | 10/1998 | Teetzel | 42/103 |
| 5,987,723 | * | 11/1999 | McNally et al. | 29/254 |

* cited by examiner

*Primary Examiner*—Michael J. Carone
*Assistant Examiner*—Michelle Thomson
(74) *Attorney, Agent, or Firm*—Moore & Van Allen; Michael G. Johnston

(57) ABSTRACT

A portable, hand-held forcible entry device is provided for opening locked or barricaded doors in emergency situations. The device comprises a firearm secured to a hollow cylindrical housing. A piston is positioned in a chamber in the housing and drives a striker. An interchangeable tool bit is mounted to the striker. When the firearm is fired, the percussive force causes the piston to move forward in the interior chamber toward the striker. The piston strikes the base of the striker causing the tool bit mounted on the striker to forcibly move forward into a target object, such as a locked or barricaded door. Compression springs are positioned in the chamber to return the piston to the firing position. The device is particularly suitable for use by law enforcement and emergency personnel for forcing locked doors open and for freeing victims trapped in automobile accidents. The device is adaptable to virtually any type of personal firearm, and may incorporate additional features, such as supplemental illumination means and a ferrous metal detector to assist in positioning the device.

2 Claims, 4 Drawing Sheets

FORCIBLE ENTRY DEVICE

CROSS REFERENCE TO RELATED APPLICATIONS

This application claims the priority benefit of U.S. Provisional patent application Ser. No. 60/044,260, filed Apr. 24, 1997, and U.S. Provisional patent application Ser. No. 60/066,900, filed Nov. 20, 1997.

BACKGROUND OF THE INVENTION

1. Field of the Invention

The present invention relates generally to a device for forcibly opening a fortified door, a barricaded passage, a damaged structure, such as a wrecked automobile, or any other barrier that requires the use of force to gain access to a building or structure. More particularly, the invention relates to a portable, hand-held, forcible entry device including a piston-driven striker that is reciprocated, preferably by gas combustion, to produce an extreme percussive force.

2. Description of Related Art

The need for authorized personnel to gain access to locked, barricaded or otherwise secured buildings and to damaged structures, particularly in response to illegal activity or an emergency, is an all too frequent occurrence in society today. For example, law enforcement officers are often required to enter a fortified building to prevent the commission of a crime or to prevent the destruction of evidence. Criminals, and in particular those dealing in illegal narcotics, often rely on increased fortification to hinder law enforcement personnel from entering buildings in which illegal activity is being conducted, thereby counteracting the element of surprise which is often critical to the success of the law enforcement operation. As a result of such increased fortification, a universal "skeleton key" is no longer useful in many instances, and the services of a highly skilled locksmith are more frequently required. Utilizing even a skilled locksmith to open a locked or barricaded door, however, is very time consuming. Consequently, the response time of law enforcement personnel is too often deleteriously delayed.

Similarly, it is often necessary in an emergency situation (e.g., a fire, tornado, earthquake, vehicle accident or hostage situation) for rescue personnel to rapidly open a locked or fortified door, a barricaded passage or a damaged structure. Because emergency situations typically call for rapid response, force is often used to gain entry through the locked or fortified door, barricaded passage or damaged structure. For example, it is often difficult after an automobile accident to rapidly extricate injured occupants due to the structural damage suffered by the vehicle. In response to this situation, a hydraulically actuated cutting tool, commonly known as the "Jaws of Life," was developed. Although the Jaws of Life has proven to be of great value in extricating occupants from wrecked vehicles, such a tool has certain limitations. First, the hydraulic pressure that is needed to operate the Jaws of Life requires a bulky and heavy power supply that makes using the tool cumbersome. Further, the operation of the jaws of the tool is relatively slow and as a consequence it can take a significant amount of time to free an individual trapped in a wrecked vehicle. Finally, the inability of the Jaws of Life to be used on anything other than a protruding object (i.e., the jaws cannot penetrate a flat surface readily without a starting point, such as an opening or a tear) limits its effectiveness in many situations.

The prevalence of barred doors and windows has likewise become a hindrance to law enforcement and emergency personnel attempting to perform their official duties. Oftentimes, bars are affixed to a door or window and must be severed or removed before access to the building can be gained. Without a key, such bars can only be removed with a time-consuming and cumbersome blow torch operation. In the case of law enforcement personnel, the element of surprise may thereby be lost and the safety of the law enforcement officers may be placed in greater jeopardy. In the case of emergency personnel, the response time used to reach the injured occupant may be lengthened and the safety of the rescue workers may be placed in greater jeopardy.

A need, therefore, exists for a device that enables law enforcement and emergency personnel to forcibly open a fortified door, barricaded passage, damaged structure or other barrier. The device must be compact and lightweight, and thus portable enough to be rapidly positioned and deployed without the need for an external power source, such as a hydraulic pressure supply, thereby reducing the amount of time required to gain access to the building or damaged structure. In addition, the forcible entry device must be versatile enough to be utilized in the many different situations which may arise in the course of duty of law enforcement and emergency personnel.

SUMMARY OF THE INVENTION

The forcible entry device of the present invention provides a highly practical means for law enforcement and emergency personnel to rapidly gain access to locked, barricaded or otherwise secured buildings and to damaged structures. The forcible entry device is compact and lightweight, and thus portable enough to be rapidly positioned and deployed without the need for an external power source. In addition, the forcible entry device is versatile enough to be utilized in the many different situations which may arise in the course of duty of law enforcement and emergency personnel.

The forcible entry device includes an attachment that is secured to the discharge end of a firing mechanism adapted for discharging the forcible entry device. In a preferred embodiment, the firing mechanism is a conventional firearm having a truncated, externally threaded barrel. The modified firearm fires a single blank cartridge, and preferably a series of blank cartridges in semi-automatic fashion, which generates a combustion gas and thereby reciprocates a piston-driven striker to produce an extreme percussive force. The attachment includes a hollow, generally cylindrical housing defining an interior chamber. The housing includes a first end having a central passage formed therein on which the attachment is mounted to the firing mechanism and a second end having a central passage formed therein from which the piston-driven striker extends outwardly from the interior chamber.

Preferably, the forcible entry device further includes a removable end cap secured by a plurality of fasteners to the first end of the housing. The central passage formed in the first end of the housing defines a centrally positioned bore through the end cap so that the interior chamber defined by the housing is in fluid communication with firing mechanism. Preferably, the bore through the end cap is internally threaded for mating with the externally threaded barrel provided on the firing mechanism.

The forcible entry device further includes a cylindrical piston positioned within the interior chamber defined by the housing adjacent the first end of the housing. Preferably, the piston has a central recess provided in the end of the piston adjacent the central passage formed in the first end of the housing. The central recess focuses the combustion gas generated by the firing mechanism into the interior chamber defined by the housing.

The forcible entry device further includes a first compression spring is positioned within the interior chamber defined by the housing. The first compression spring biases the piston towards the first end of the housing so that the piston is rapidly returned and maintained in the firing position after each discharge of the forcible entry device. A second compression spring is positioned within the interior chamber defined by the housing. The second compression spring biases the piston-driven striker away from the second end of the housing so that the striker is rapidly returned and maintained in the firing position after each discharge of the forcible entry device.

The piston-driven striker of the forcible entry device is reciprocally mounted within the interior chamber defined by the housing between the first compression spring and the second compression spring. The piston-driven striker includes a base portion proximate to the piston and an upper portion that extends outwardly from the interior chamber through the central passage formed in the second end of the housing.

The forcible entry device further includes a generally cylindrical bumper positioned within the interior chamber defined by the housing adjacent the second end of the housing. The bumper absorbs the percussive force produced by the piston-driven striker to lessen the recoil experienced by the operator of the forcible entry device.

The forcible entry device further includes a removable end collar secured by a plurality of fasteners to the second end of the housing. The central passage formed in the second end of the housing defines a centrally positioned bore through the end collar that may be fitted with a self-lubricating O-ring to permit the upper portion of the piston-driven striker to reciprocate freely within the bore formed through the end collar.

Finally, the forcible entry device includes an interchangeable tool bit secured to the upper portion of the piston-driven striker. The tool bit extends outwardly from the second end of the housing within the bore formed through the end collar. The tool bit may, for example, be a ram having a flat working contact face thereon, a chisel wedge having a sharp cutting edge thereon or a spike having a sharp point for puncturing thereon.

In preferred embodiments, the forcible entry device may further include illumination means for illuminating the area surrounding the upper portion of the piston driven striker and the tool bit. A bracket mounted on the external surface of the housing may be provided for removably attaching the illumination means to the forcible entry device. The forcible entry device may further include density detection means for detecting the density of ferrous metal objects adjacent the upper portion of the piston-driven striker and the tool bit. A bracket mounted on the external surface of the housing may be provided for removably attaching the density detection means to the forcible entry device.

During normal operation, a tool bit is selected and secured to the upper portion of the piston-driven striker. The attachment is then secured to the firing mechanism, preferably by threading the end cap onto the externally threaded barrel of a firearm adapted for discharging the forcible entry device. The firing mechanism is then loaded with at least one blank charge. The forward edge of the tool bit is then positioned against the locked door, damaged structure or other barrier to be opened and the operator fires the blank charge to discharge the forcible entry device.

Within the interior chamber defined by the housing, expansion of the combustion gas generated by firing the blank charge forces the piston, the first compression spring, the piston-driven striker, the second compression spring and the tool bit towards the second end of the housing. The piston compresses the first compression spring and strikes the base portion of the piston-driven striker. The striker and attached tool bit are thereby moved forward with great percussive force against the locked door, damaged structure or other barrier so that the law enforcement or emergency personnel may gain access to the building or structure.

Preferably, the housing is provided with exhaust ports that are in fluid communication with the interior chamber. At a predetermined position, the combustion gas behind the piston is permitted to escape from the interior chamber. Thereafter, the first compression spring biases the piston towards the first end of the housing and the second compression spring biases the piston-driven striker away from the second end of the housing against the first compression spring. Thus, the forcible entry device is returned to the firing position.

The forcible entry device is particularly advantageous for use by authorized personnel to gain access to locked, barricaded or otherwise secured buildings and to damaged structures, particularly in response to illegal activity or in response to an emergency. The forcible entry device is also compact and lightweight, and thus portable enough to be rapidly positioned and deployed without the need for an external power source. In addition, the forcible entry device is versatile enough to be utilized in the many different situations which may arise in the course of duty of law enforcement and emergency personnel.

SUMMARY OF THE OBJECTS OF THE INVENTION

Accordingly, a principle object of the present invention is to provide a forcible entry device which permits law enforcement and emergency personnel to rapidly gain access to building or structure.

Another object of the invention is to provide a forcible entry device that is lightweight, compact and portable enough to be rapidly positioned and deployed without the need for an external power source.

Another object of the invention is to provide a forcible entry device that is versatile enough to be utilized in the many different situations which may arise in the course of duty of law enforcement and emergency personnel.

Another, and more particular object of the invention is to provide a forcible entry device that utilizes a suitably modified conventional firearm to fire an explosive blank charge which generates a combustion gas to produce a percussive force.

Another, and more particular object of the invention is to provide a forcible entry device which utilizes interchangeable tool bits depending upon the locked door, damaged structure or other barrier to be opened.

BRIEF DESCRIPTION OF THE DRAWINGS

In view of these and other objects which will more readily appear as the nature of the invention is better understood, the invention consists in the novel combination and arrangement of the parts hereinafter more fully described, illustrated and claimed, with reference being made to the appended drawings in which:

DESCRIPTION OF THE PREFERRED EMBODIMENTS

The forcible entry device, indicated generally at 10, comprises an attachment A mounted on a firing mechanism F adapted to discharge the forcible entry device. The forcible entry device 10 produces an extreme percussive force, preferably by expansion of a combustion gas inside the attachment A that is generated by an explosive blank charge fired by the firing mechanism F. The extreme percussive force is utilized by law enforcement and emergency personnel to forcibly open, for example, a fortified door, a barricaded passage, a damaged structure, such as a wrecked vehicle, or any other barrier that requires the use of force to gain access to a building or structure. Accordingly, law enforcement may rapidly perform their duties without exposing themselves or others to unnecessary risk of injury and emergency personnel may rapidly extricate injured occupants of the wrecked vehicle.

Figure 1:
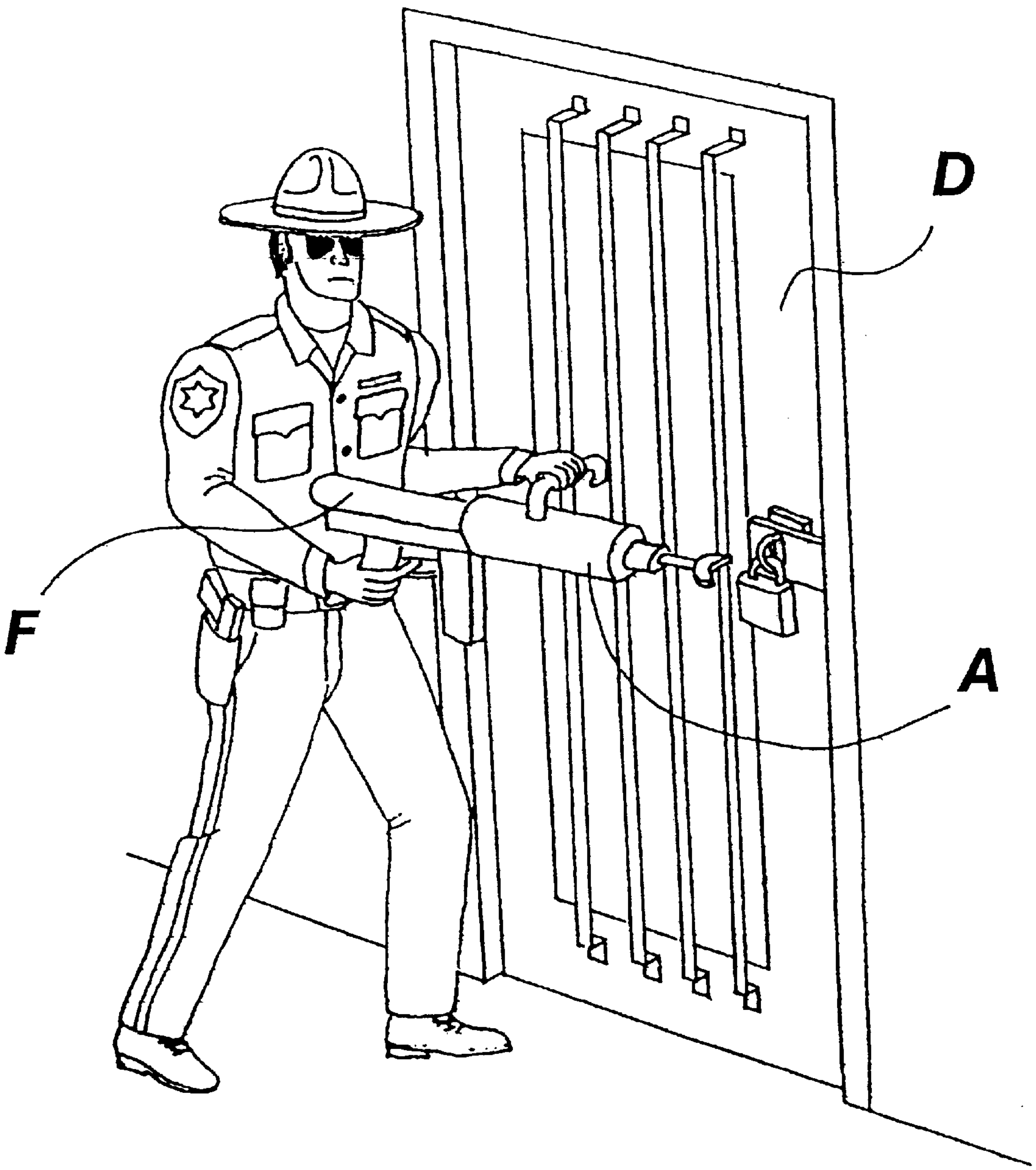
FIG. 1 is a perspective view of a forcible entry device according to the invention illustrating operation of the forcible entry device by authorized personnel to gain access to a building through a fortified door.

As illustrated in FIG. 1, the forcible entry device 10 may be used by law enforcement personnel to rapidly gain access through a fortified door D. The forcible entry device 10 includes an attachment A that is secured to the discharge end of a firing mechanism F adapted for discharging the forcible entry device 10. In a preferred embodiment, the firing mechanism F is a conventional firearm having a truncated, externally threaded barrel. The modified firearm fires a single blank cartridge, and preferably a series of blank cartridges in semi-automatic fashion, which generates a combustion gas and thereby reciprocates a piston-driven striker 28 to produce an extreme percussive force.

Figure 2:
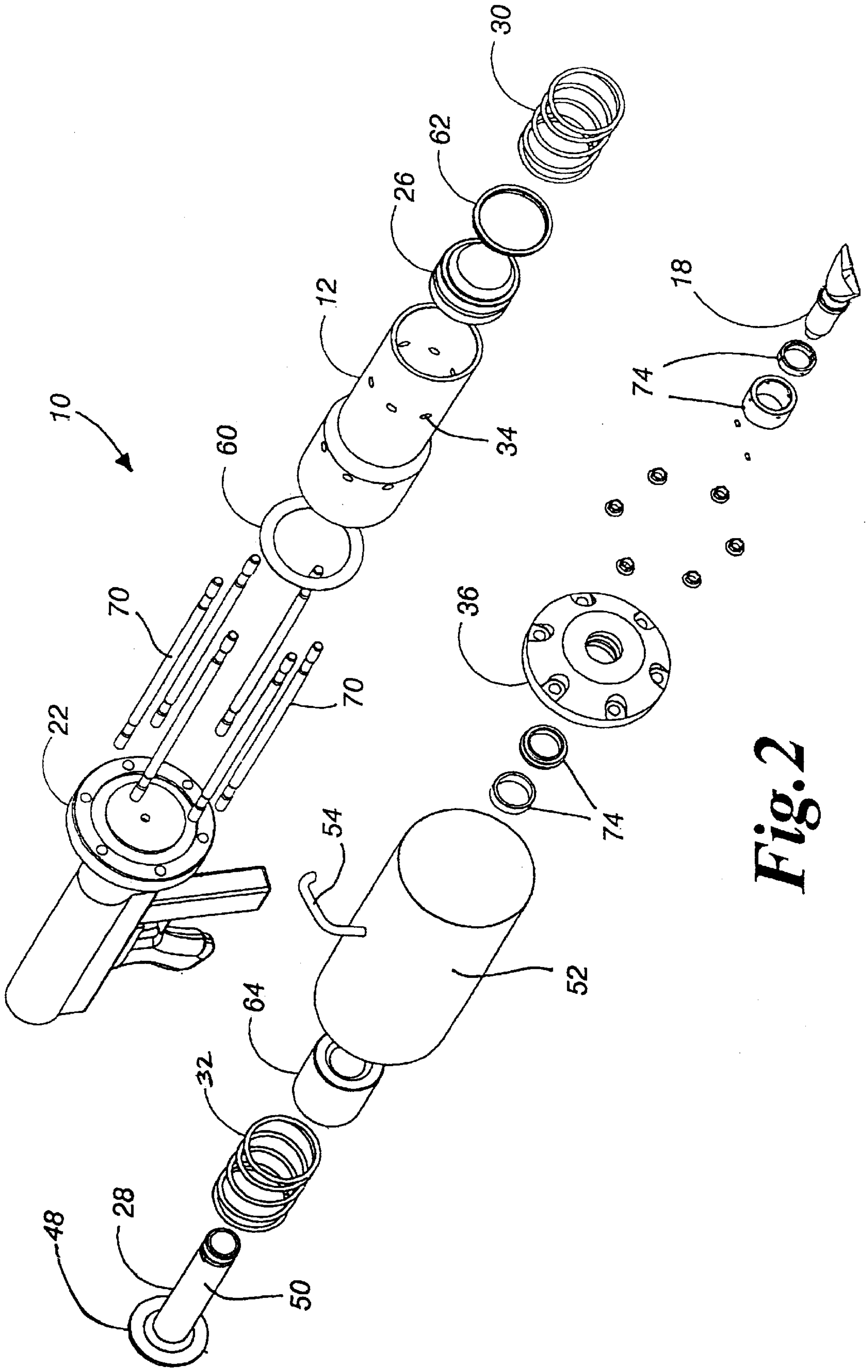
FIG. 2 is an exploded view of the components of the forcible entry device of FIG. 1.
Figure 3:
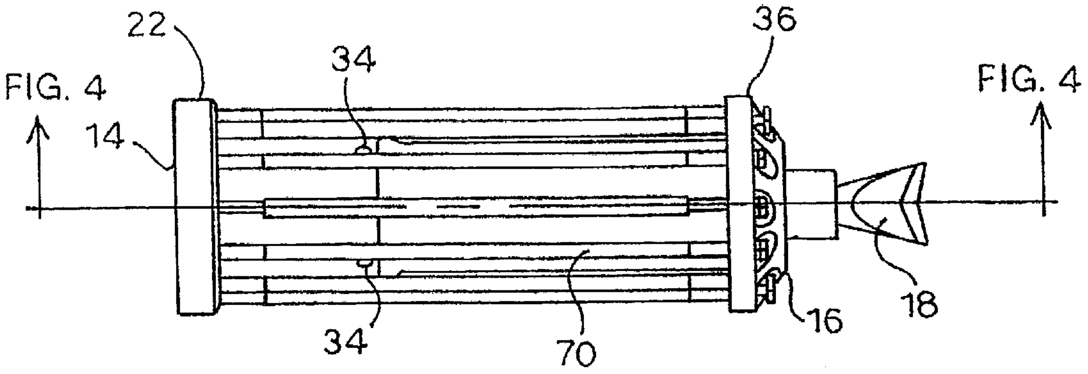
FIG. 3 is a side view of the attachment of the forcible entry device of FIG. 1.
Figure 4:
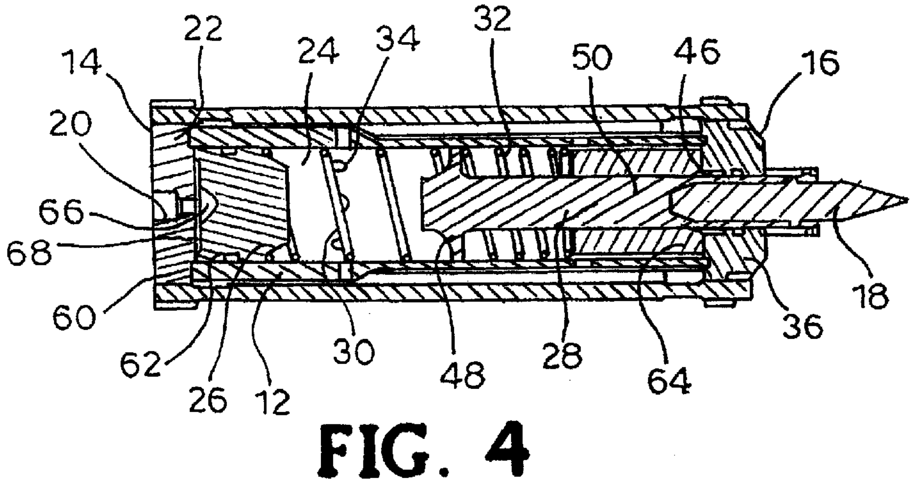
FIG. 4 is a cross-section of the attachment of the forcible entry device of FIG. 1 taken along line 4—4 of FIG. 3.

As shown in FIGS. 2–4, the attachment includes a hollow, generally cylindrical housing 12 defining an interior chamber 24. The housing 12 includes a first end 14 having a central passage (not shown) formed therein on which the attachment A is mounted to the firing mechanism F and a second end 16 having a central passage (not shown) formed therein from which the piston-driven striker 28 extends outwardly from the interior chamber 24.

Preferably, the forcible entry device 10 further includes a removable end cap 22 secured by a plurality of fasteners to the first end 14 of the housing 12. The central passage formed in the first end 14 of the housing 12 defines a centrally positioned bore 20 through the end cap 22 so that the interior chamber 24 defined by the housing 12 is in fluid communication with firing mechanism F. Preferably, the bore 20 through the end cap 22 is internally threaded for mating with the externally threaded barrel provided on the firing mechanism F.

The forcible entry device 10 further includes a cylindrical piston 26 reciprocally positioned within the interior chamber 24 defined by the housing 12 adjacent the first end 14 of the housing 12. Preferably, the piston 26 has a central recess 66 provided in the end 68 of the piston 26 adjacent the central passage formed in the first end 14 of the housing 12. The central recess 66 focuses the combustion gas generated by the firing mechanism F into the interior chamber 24 defined by the housing 12.

The forcible entry device 10 further includes a first compression spring 30 positioned within the interior chamber 24 defined by the housing 12. The first compression spring 30 biases the piston 26 towards the first end 14 of the housing 12 so that the piston 26 is rapidly returned and maintained in the firing position after each discharge of the forcible entry device 10. A second compression spring 32 is positioned within the interior chamber 24 defined by the housing 12. The second compression spring 32 biases the piston-driven striker 28 away from the second end 16 of the housing 12 so that the striker 28 is rapidly returned and maintained in the firing position after each discharge of the forcible entry device 10.

The piston-driven striker of 28 of the forcible entry device 10 is reciprocally mounted within the interior chamber 24 defined by the housing 12 between the first compression spring 30 and the second compression spring 32. The piston-driven striker 28 includes a generally disc-shaped base portion 48 proximate to the piston 26 and a generally cylindrical upper portion 50 that extends outwardly from the interior chamber 24 through the central passage formed in the second end 16 of the housing 12.

The forcible entry device 10 further includes a generally hollow cylindrical bumper 64 positioned within the interior chamber 24 defined by the housing 12 adjacent the second end 16 of the housing 12. The bumper 64 is positioned around upper portion 50 of the piston-driven striker 28 and is contacted by the base portion 48 of the piston-driven striker 28. The bumper 64 absorbs the percussive force produced by the piston-driven striker 28 to lessen the recoil experienced by the operator of the forcible entry device 10.

The forcible entry device 10 further includes a removable end collar 36 secured by the plurality of fasteners to the second end 16 of the housing 12. The central passage formed in the second end 16 of the housing 12 defines a centrally positioned bore 46 through the end collar 36 that may be fitted with a ball bearing assembly 74 to permit the upper portion 50 of the piston-driven striker 28 to reciprocate freely within the bore 46 formed through the end collar 36.

Finally, the forcible entry device 10 includes an interchangeable tool bit 18 secured to the upper portion 50 of the piston-driven striker 28. The tool bit 18 extends outwardly from the second end 16 of the housing 12 within the bore 46 formed through the end collar 36. The tool bit 18 may, for example, be a ram having a flat working contact face thereon, a chisel wedge having a sharp cutting edge thereon or a spike having a sharp point for puncturing thereon.

In an alternative embodiment, the end cap 22 and the end collar 36 have a nearly equivalent outside diameter that is larger than the outside diameter of the housing 12. The end cap 22 and end collar 36 are axially aligned with the housing 12. A plurality of bolts 70 are circumferentially arranged around the housing 12 and have first ends inserted through holes in the end cap 22 and the second ends extending through holes in the end collar 36. Nuts are positioned over the second ends of the bolts 70 to tightly position the housing 12 between the end cap 22 and the end collar 36. A hollow generally cylindrical protective cover 52 having an outside diameter nearly equivalent to that of the end cap 22 and end collar 36 is positioned between the end cap 22 and the end collar 36. The cover 52 surrounds the housing 12. A handle 54 extends from the cover 52 to provide a grip for the operator of the forcible entry device 10.

Figure 5:
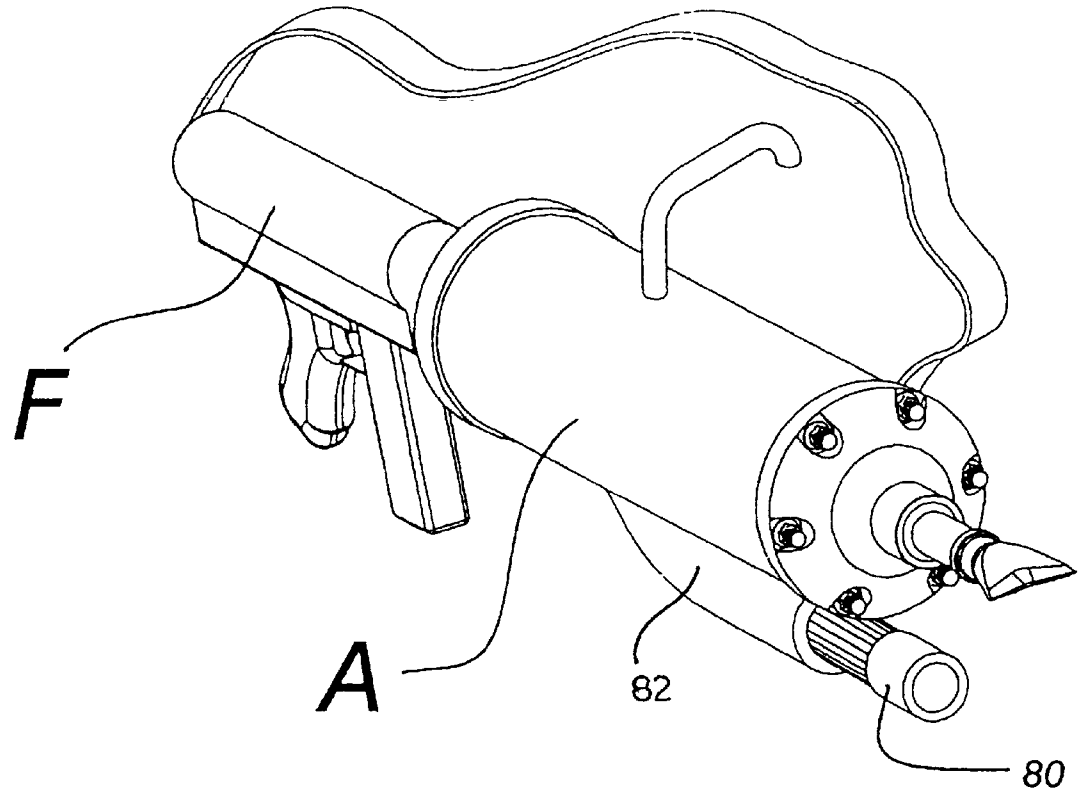
FIG. 5 is a perspective view of a preferred embodiment of the forcible entry device of FIG. 1 including an attachment secured to a firing mechanism adapted to discharge the forcible entry device, and illumination means and a handle provided on the attachment.

As shown in FIG. 5, the forcible entry device 10 may further include illumination means 80 for illuminating the area surrounding the upper portion 50 of the piston driven striker 28 and the tool bit 18. A bracket 82 mounted on, or integrally molded with, the cover 52 may be provided for removably attaching the illumination means 80 to the forcible entry device 10. The forcible entry device 10 may further include density detection means (not shown) for detecting the density of ferrous metal objects adjacent the upper portion 50 of the piston-driven striker 28 and the tool bit 18. A bracket mounted on the cover 52 may be provided for removably attaching the density detection means to the forcible entry device 10.

From the foregoing, it is readily apparent that I have invented a forcible entry device 10 for forcibly opening fortified doors, barricaded passages, and damaged structures in emergency situations, including freeing occupants from vehicles following an accident. The interchangeable working bits 18 make the invented forcible entry device 10 rapidly adaptable for use in many situations. By using a percussive force from a firing mechanism F, the forcible entry device 10 is compact, hand-held and readily portable making the device a powerful tool in the law enforcement and emergency personnel arsenal.

During normal operation, a tool bit 18 is selected and secured to the upper portion of the piston-driven striker 28. The attachment A is then secured to the firing mechanism F, preferably by threading the end cap 22 onto the externally threaded barrel of a firearm adapted for discharging the forcible entry device 10. The firing mechanism F is then loaded with at least one blank charge. The forward edge of the tool bit 18 is then positioned against the locked door, damaged structure or other barrier to be opened and the operator fires the blank charge to discharge the forcible entry device 10.

Within the interior chamber 24 defined by the housing 12, expansion of the combustion gas generated by firing the blank charge forces the piston 26, the first compression spring 30, the piston-driven striker 28, the second compression spring 32 and the tool bit 18 towards the second end 16 of the housing 12. The piston 26 compresses the first compression spring 30 and strikes the base portion 48 of the piston-driven striker 28. The striker 28 and attached tool bit 18 are thereby moved forward with great percussive force against the locked door, damaged structure or other barrier so that the law enforcement or emergency personnel may gain access to the building or structure.

Preferably, the interior chamber 24 is sealed between the firing mechanism and the piston. A gasket 60 is positioned between the first end 14 of the housing 12 and the end cap 22 for preventing the flow of gas out of the first end of the housing 12. An O-ring 62 is circumferentially positioned between the piston 26 and the inner surface of the housing 12 to prevent the flow of gas around the piston 26. An air-tight seal is thereby created between the end cap 22 and the piston 26.

Preferably, the housing 12 is provided with exhaust ports 34 that are in fluid communication with the interior chamber 24. At a predetermined position, the combustion gas behind the piston 26 is permitted to escape from the interior chamber 24 through the exhaust ports 34. Thereafter, the first compression spring 30 biases the piston 26 towards the first end 14 of the housing 12 and the second compression spring 32 biases the piston-driven striker 28 away from the second end 16 of the housing 12 against the first compression spring 30. Thus, the forcible entry device 10 is returned to the firing position.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

That which is claimed is:

1. A forcible entry device for gaining access to a fortified or damaged structure, the forcible entry device comprising:

- a firing mechanism;
- a hollow housing defining an interior chamber therein, said housing comprising a first end and a second end opposite said first end, each of said first end and said second end having a passage formed therethrough;
- means for securing said first end of said housing to said firing mechanism such that combustion gas generated by said firing mechanism is in fluid communication with the interior chamber defined by said housing through the passage formed in said first end of said housing;
- a piston positioned within the interior chamber defined by said housing adjacent said first end of said housing;
- a piston-driven striker reciprocally mounted within the interior chamber defined by said housing, said striker comprising a base portion proximate to said piston and an upper portion extending outwardly from the interior chamber through the passage formed in said second end of said housing;
- a removable end cap secured by a plurality of fasteners to said first end of said housing such that the passage formed in said first end is centrally positioned within said end cap; and
- means for sealing the interior chamber defined by said housing to prevent the combustion gas generated by said firing mechanism from escaping the interior chamber, wherein said means for sealing the interior chamber comprises an annular gasket positioned between said end cap and said housing and an o-ring positioned between said piston and said housing.

2. A forcible entry device for gaining access to a fortified or damaged structure, the forcible entry device comprising:

- a firing mechanism;
- a hollow housing defining an interior chamber therein, said housing comprising a first end and a second end opposite said first end, each of said first end and said second end having a passage formed therethrough;
- means for securing said first end of said housing to said firing mechanism such that combustion gas generated by said firing mechanism is in fluid communication with the interior chamber defined by said housing through the passage formed in said first end of said housing;
- a piston positioned within the interior chamber defined by said housing adjacent said first end of said housing;
- a piston-driven striker reciprocally mounted within the interior chamber defined by said housing, said striker comprising a base portion proximate to said piston and an upper portion extending outwardly from the interior chamber through the passage formed in said second end of said housing; and
- density detection means for detecting the density of ferrous metal adjacent said upper portion of said striker and a bracket mounted on the external surface of said housing for removably attaching said density detection means to the forcible entry device.

* * * * *